United States Patent [19]

Nakagawa et al.

[11] Patent Number: 4,866,546

[45] Date of Patent: Sep. 12, 1989

[54] RECORDING AND REPRODUCING APPARATUS FOR DISK-TYPE RECORDING MEDIA

[75] Inventors: Shozo Nakagawa; Shunichi Ohnishi; Akihiro Takagi, all of Tokyo, Japan

[73] Assignees: Kabushiki Kaisha Asaka; Nippon Kogaku KK, both of Tokyo, Japan

[21] Appl. No.: 111,696

[22] Filed: Oct. 21, 1987

[30] Foreign Application Priority Data

Oct. 22, 1986 [JP] Japan .................................. 61-249463

[51] Int. Cl.⁴ .......................... G11B 5/03; G11B 15/12
[52] U.S. Cl. ........................................... 360/66; 360/61
[58] Field of Search ........................ 360/60, 61, 66, 57; 369/54, 57

[56] References Cited

U.S. PATENT DOCUMENTS 4,466,025  8/1984  Soejima ................................. 360/57
4,633,337  12/1986  Horie et al. ........................... 360/57

*Primary Examiner*—Vincent P. Canney
*Attorney, Agent, or Firm*—Michael N. Meller

[57] ABSTRACT

A recording and reproducing apparatus for a disk-type recording medium including an erase head and a record head which are arranged with a certain rotational angular spacing. The apparatus includes a controller for generating a first signal to operate the erase head and a second signal to operate the record head, and a timing adjusting circuit for delaying either one of the first and second signals to compensate for an error of the angular spacing.

2 Claims, 5 Drawing Sheets

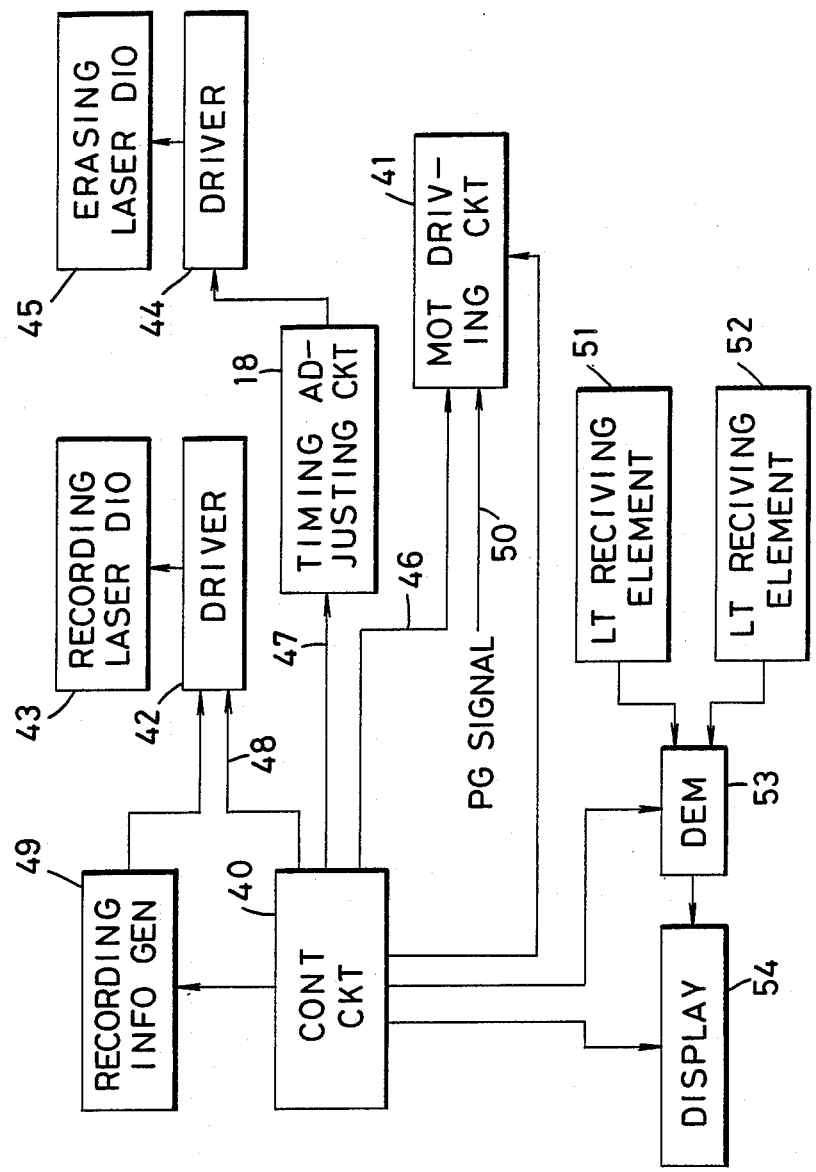

FIG.3
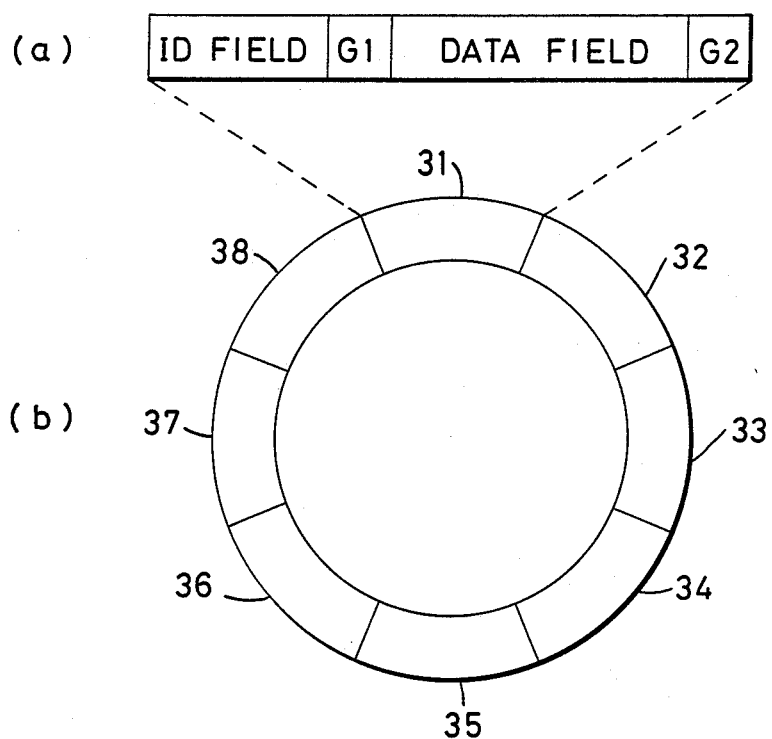
FIG.4
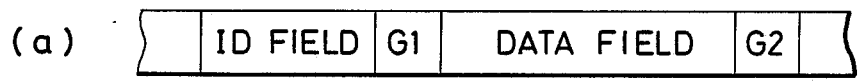

RECORDING AND REPRODUCING APPARATUS FOR DISK-TYPE RECORDING MEDIA

BACKGROUND OF THE INVENTION

The present invention relates to recording and producing apparatus for disk-type recording media of the type which employs an erase head and a record head.

With conventional apparatus of the above type, there has been a disadvantage that when the record head and the erase head are arranged separately with respect to a disk-type recording medium such as a magnetic, recording medium optical recording medium or magneto-optical recording medium, the amount of deviation between the relative mechanical positions of the record head and the erase head has a serious effect on the alignment accuracy of the recording and erasing positions of information on the recording medium.

SUMMARY OF THE INVENTION

It is the primary object of the present invention to provide a recording and reproducing apparatus for disk-type recording media which is so designed that any alignment errors of the recording and erasing positions of information due to the improper amount of the relative mechanical positional deviation between an erase head and a record head are reduced with a simple construction.

BRIEF DESCRIPTION OF THE DRAWINGS

FIG. 2 is a block diagram showing a circuit construction of the apparatus according to the preferred embodiment of the invention.

FIG. 3A and B are a diagram showing an example of a data recording format for a recording medium used with the apparatus of this invention.

FIG. 4A, B and C are a diagram showing the format and the timings of gate signals.

DETAILED DESCRIPTION OF THE PREFERRED EMBODIMENT

Figure 1A:
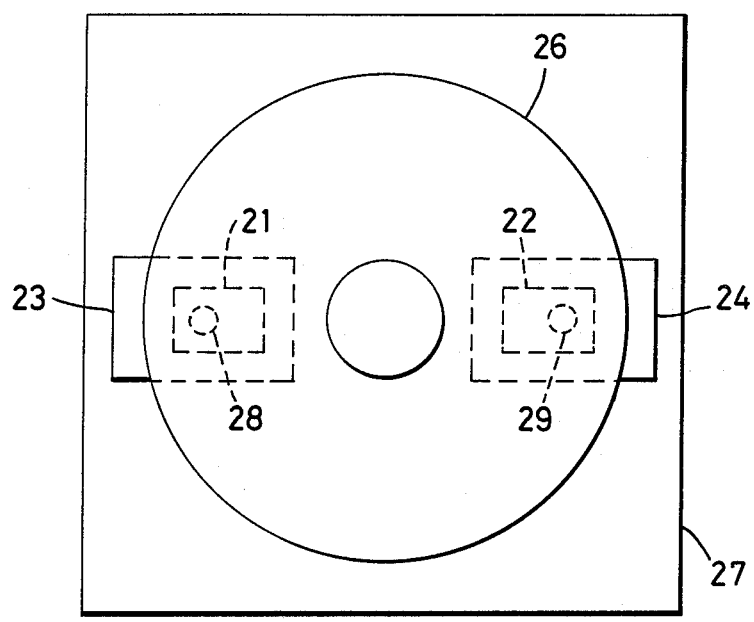
FIG. 1A is a schematic plan view of an apparatus according to the preferred embodiment of the invention.
Figure 1B:
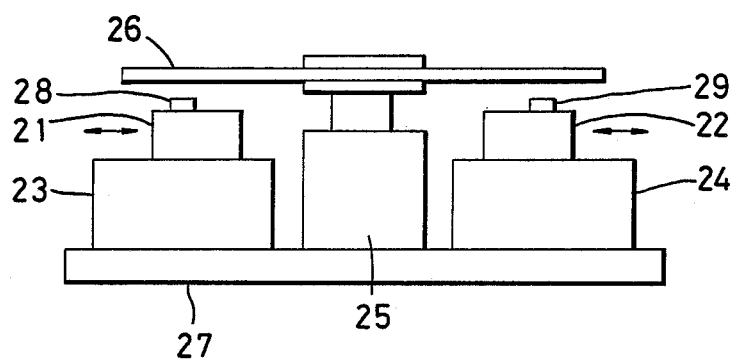
FIG. 1B is a schematic side view of the apparatus according to the preferred embodiment of the invention.

Referring to FIGS. 1A and 1B, numeral 21 designates a record head which is mounted on a record head slider 23 and movable in the radial direction. Numeral 22 designates an erase head which is similarly mounted on an erase head slider 24 and movable in the radial direction. An optical head 28 is an optical system for directing to a disk the laser beam from a laser diode 43 (see FIG. 2) of the record head 21 which will be described later and similarly an optical head 29 is an optical system for directing to the disk the laser beam from a laser diode 45 (see FIG. 2) of the erase head 22 which will be described later.

Numeral 26 designates a disk comprising, for example, a magneto-optical recording medium and its rotation is subjected to a constant-speed constant-phase control by a spindle motor 25. In this embodiment, the constant-speed constant-phase control is performed by a clock circuit construction as shown in FIG. 2. A control circuit 40 applies to a disk driving spindle motor driving circuit 41 a fixed-frequency rotational reference signal 46 and a rotation phase signal 50 (a so-called PG signal or phase generate signal generated at the rate of one pulse per rotation) taken from the spindle motor or the recording medium to control the phase of the motor rotation in such a manner that a given phase relation is established between the reference signal 46 and the PG signal 50, thereby effecting the constant-speed constant-phase rotation control. The spindle motor driving circuit 41 may be of a known construction, e.g., PLL (phase locked loop) construction.

In other words, in this embodiment the control circuit 40 applies the rotational reference signal 46 to the spindle motor driving circuit 41 and therefore it always detects the rotational position of the disk.

Numerals 42 and 44 respectively designate laser diode drivers, 43 designates the recording laser diode (hereinafter simply referred to as LD), and 45 designates the erasing LD. The recording LD 43 is contained in the record head 21 and the erasing LD 45 is contained in the erase head 22.

A timing adjusting circuit 18 forms means for delaying an erasing gate signal 47. A recording information generator 49 forms means for generating information which is written on the disk 26 by the recording LD 43, and thus during the time that a recording gate signal 48 is at an L level, the control circuit 40 causes the recording information generator 49 to deliver information subjected to the desired modulation to the driver 42, thereby causing the driver 42 to drive the LD 43. A light receiving element 51 is contained in the record head 21 so that the reflected light from the disk 26 is received through the optical head 28 and a signal corresponding to the intensity of the received reflected light is delivered to a demodulator 53. Another light receiving element 52 is also contained in the erase head 22 to generate a signal corresponding to the intensity of the reflected light from the disk 26 through the optical head 29. A display device 54 comprising a CRT or the like makes a display in response to the output of the demodulator 53. Also, the demodulator 53 is responsive to the output of the control circuit 40 to select and demodulate one or the other of the outputs from the light receiving elements 51 and 52.

FIG. 3 shows an example of a data recording format for the disk 26. The disk 26 is formed with a plurality of tracks in concentric form. The data structure is a sector structure and each track corresponding to one rotation is divided into eight sectors 31 to 38 as shown by the exemplary format in (b) of FIG. 3. In addition, as shown by the sector format in (a) of FIG. 3, each of the sectors is divided into an ID field showing a track address and a sector address and a DATA field for storing the user data and gaps $G_1$ and $G_2$ are respectively arranged at the boundary areas of the two fields.

The user records an ID field containing data such as a track address and a sector address (see FIG. 3(a)) for each of the sectors on the recording medium 26 by the record head 21.

To record each ID field at which position of the track is controlled by the driving circuit 41 so that the phase difference between the reference signal 46 and the disk 26 assumes a given relation, thereby causing the control circuit 40 to determine the rotational position of the spindle motor or of the recording medium as mentioned previously. In other words, the control circuit 40 includes an internal timer so that the counting of the internal timer is started in response to the leading edge of the pulse-type reference signal 46 having the same period as the PG signal 50 at the time that the disk 26 reaches a predetermined rotational speed, and the rotational position of the disk 26 is determined in accordance with the content of the internal timer. Then, the recording is effected in such a manner that there always exists a constant phase difference between the position of the ID field and the rotational reference signal 46.

The contents of each DATA field are recorded by the record head 21. At the start position of the DATA field in each sector, the control circuit 40 generates a recording gate signal as shown in (b) of FIG. 4 in accordance with the content of the internal timer. When this signal goes to a low level (hereinafter referred to as an L level), the LD 43 is caused to emit a laser beam to record this signal.

The contents of the DATA field are erased by the erase head 22. At the starting position of the DATA field in each sector, the control circuit 40 generates an erasing gate signal as shown in (c) of FIG. 4 in accordance with the content of the internal timer.

Then, where the erase head 24 is not arranged with a predetermined angular spacing (180° in the case of FIG. 1) between it and the record head 21 with a high degree of accuracy, there is the danger of erroneously erasing the ID field before or behind the DATA field during its erasing.

Also, much time and labor are required for making the required adjustments to accurately arrange the record head 21 and the erase head 22 and prevent the ID field from being erased erroneously. If the format of the sectors is changed so that the ID field is not erroneously erased even if the record head 21 and the erase head 22 are not arranged accurately, it is necessary to widen the gaps $G_1$ and $G_2$ which are provided to protect the ID fields from the effect of variations in the rotation of the spindle motor 25 and this attempt gives rise to the problem of decreasing the area actually available for the user for the recording of data on the recording medium.

To overcome this deficiency, in accordance with the invention the timing of delivering the erasing gate signal 47 to the driver 44 from the control circuit 40 is adjusted by the timing adjusting circuit 18 by an amount corresponding to the deviation of the erase head 24 from the specified position, thereby correcting the positional error.

Figure 5:
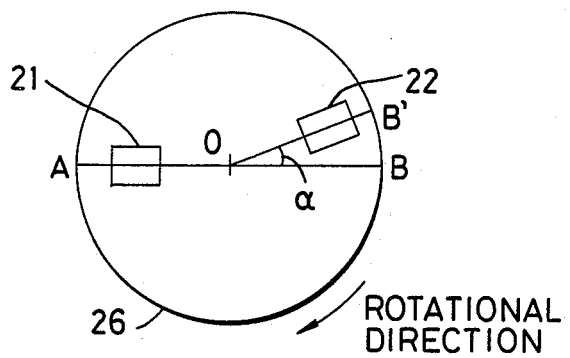
FIG. 5 is a schematic diagram useful for explaining the principle of the apparatus according to the preferred embodiment of the invention.

Then, where the record head 21 and the erase head 22 are ideally adjusted and arranged, the two heads are arranged on the straight line AOB as shown in FIG. 5 and thus the use of a recording gate signal and an erasing gate signal as shown respectively in (b) and (c) of FIG. 4 prevents the occurrence of erroneous erasing of the ID field. However, if the erase head 22 is arranged on the straight line OB' shown in FIG. 5, an error corresponding to an angle $\alpha$ is caused as compared with the ideally arranged case.

Figure 6:
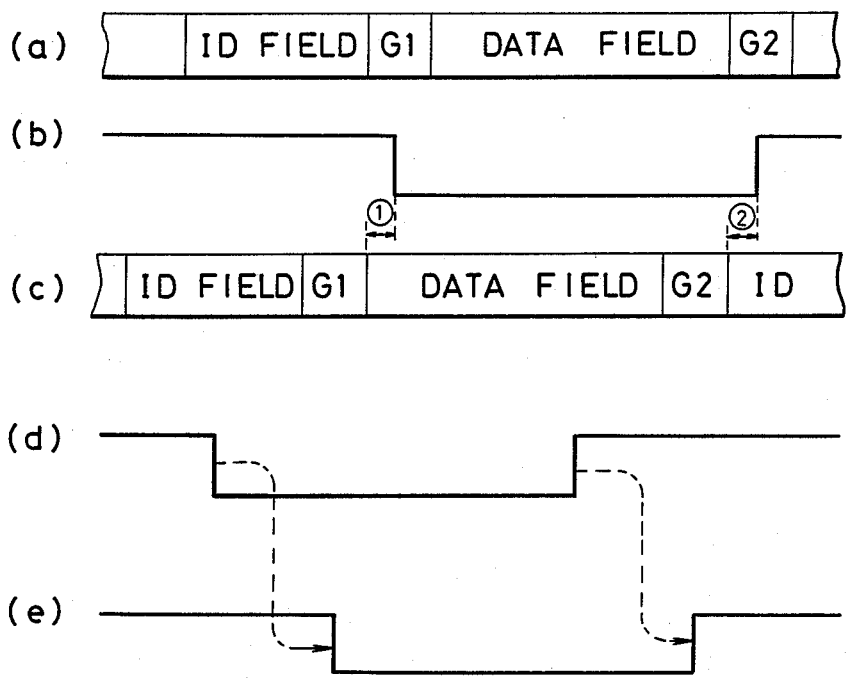
FIG. 6A, B, C, D and E are a diagram showing the format and the timings of gate signals for explaining the principle of the apparatus of this invention.

FIG. 6 shows the timings of the signals at various points in the case involving the error angle $\alpha$.

In FIG. 6, (a) is the diagram for comparison purposes so that if the erase head 22 is arranged on the straight line OB and the DATA field is erased by the erasing gate signal (see (b) of FIG. 6) delivered at the specified timing due to an error angle $\phi$, the ID field is not erased erroneously. In fact, however, the erase head 22 is arranged on the straight line OB' and therefore the signal passes over the head at an earlier time than the time of (a). This is shown in (c) of FIG. 6.

At this time, if the erasing is effected by the gate signal shown in (b) of FIG. 6, an unerased portion is caused in an interval 1 and the ID field of the next sector is erased erroneously in an interval 2. As a result, in accordance with the invention the erasing gate signal 47 is generated earlier than the specified time as shown in (d) of FIG. 6 and its timing is adjusted by the timing adjusting circuit 18 to obtain the gate signal shown in (e) of FIG. 6.

When the DATA field shown in (c) of FIG. 6 is erased by the thus obtained erasing gate signal shown in (e) of FIG. 6, neither an unerased portion nor any erroneous erasing are caused.

Figure 7:
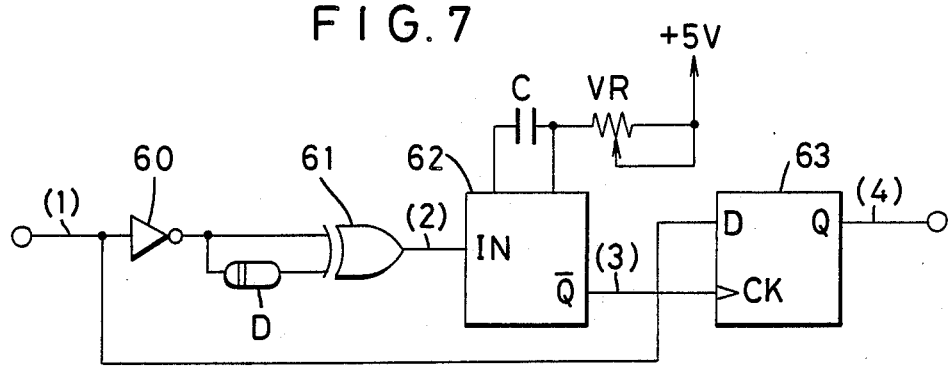
FIG. 7 is a circuit diagram showing an example of the timing adjusting circuit in accordance with the preferred embodiment of the invention.
Figure 8:
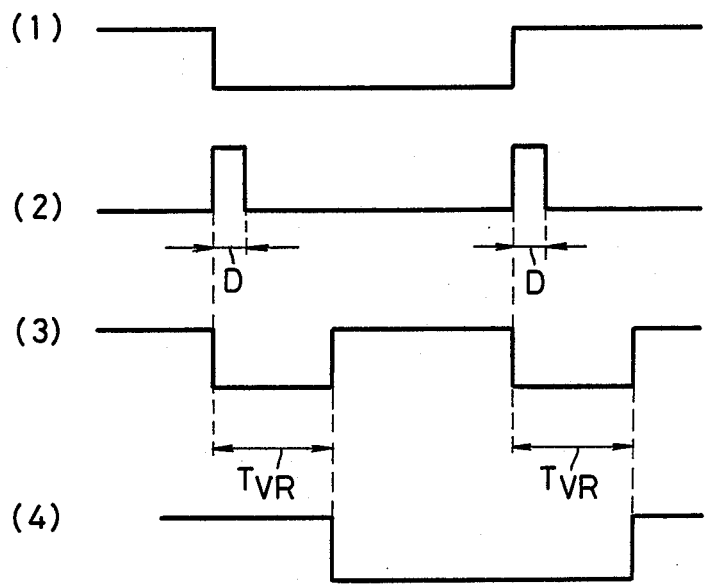
FIG. 8 is a timing chart showing the timings of signals generated at various points in FIG. 7.

FIG. 7 shows a specific circuit diagram of the timing adjusting circuit used in this embodiment and FIG. 8 shows a timing chart for the signals generated at various points in the circuit of FIG. 7.

The input signal shown in (1) of FIG. 8 is inverted by an inverter 60. The inverted signal and and the signal delayed by a time D by a delay element D are applied to an exclusive OR circuit 61, thereby detecting the edges by the output of the circuit 61 and generating the signal shown in (2) of FIG. 8. The signal (2) is applied to the input of a monostable multivibrator 62 which in turn generates an output as shown in (3) of FIG. 8. The time width of the output pulse (3) can be adjusted by means of a voltage regulator (VR).

The output pulse (3) is applied as a clock input to a D-type flip-flop 63 and the application of the signal (1) as a D input results in an output as shown in (4) of FIG. 8 representing the signal (1) delayed by an arbitrary time width. The pulse time width $T_{VR}$ is adjusted by monitoring the output of the light receiving element 52 contained in the erase head 22 by the display device 54 and comparing it with the PG signal, for example.

As shown in FIG. 7, the timing adjusting circuit of this embodiment is constructed without using any special circuit elements and thus it is low in cost.

Since the adjustment can be effected in terms of volume or the like, the productivity can be increased by lowering the positioning accuracy of heads and any variations among individual apparatus can be corrected by adjusting the volume during the final adjusting operation.

It is to be noted that while, in the above-described embodiment, the timing adjusting circuit 18 is inserted before the laser diode driver 44 of the erase head 22 to which the erasing gate signal 47 is applied, the timing adjusting circuit 18 may be inserted before the laser diode driver 42 of the record head 21 to which the recording gate signal 48 is applied. Further, while the embodiment has been described as applied to the recording and reproducing apparatus for magneto-optical recording media, the invention is also applicable to recording and reproducing apparatus for other disk-type information recording media such as optical and magnetic disk apparatus.

Further, while the preferred embodiment has been described as applied to the case in which the disk has uniform angular speed rotation, even in the case of uniform linear speed rotation the disk controller is generally capable of detecting the rotational position of the disk and therefore the invention is also applicable to the case of uniform linear speed rotation.

Further, although the above-described embodiment uses a single record head and a single erase head, the requirements can be met by modifying the construction even if the numbers of record and erase heads are increased. Of course, the invention is equally applicable to cases where the record and erase heads are not arranged 180 degrees apart from each other.

Still further, although in the preferred embodiment, the erasing gate signal 47 is delayed analogically, it may for example be delayed digitally. Where the erasing gate signal is controlled digitally, the same object can be attained by using, for example, a microcomputer such that the internal counter of the microcomputer starts counting in response to the recording gate signal 48 and the erasing gate signal 47 is outputted when the internal counter counts up and by making the content of the internal counter adjustable.

From the foregoing description it will be seen that in accordance with the invention, by virtue of the fact that any timing deviation due to the lowering of the positioning accuracy for the arrangement of the heads is corrected by electrically adjusting either the timing of the erasing gate signal or the timing of the recording gate signal, in the management of the disk information recording and reproducing apparatus the occurrence of any erroneous erasing of data is prevented. Moreover the addition of simple and inexpensive electric circuitry can eliminate much labor and cost which have heretofore been required for ensuring a highly accurate positioning.

We claim:

1. A recording and reproducing apparatus for a recording medium comprising:
   (a) record head means for recording information on a recording medium;
   (b) erase head means for erasing the information recorded on said recording medium;
   (c) driving means for rotating said recording medium about a given axis at a predetermined rotational speed, each of said record head means and said erase head means being fixedly mounted in a predetermined positional relation with respect to said axis;
   (d) control means responsive to the rotation of said recording medium to output a first actuation signal to said record head means and a second actuation signal to said erase head means thereby operating said record head means and said erase head means; and
   (e) delay means for delaying either one of said first and second actuation signals to reduce an error in the arrangement of said record head means and said erase head means in said predetermined positional relations, wherein said delay means includes means adapted for operation to adjust said delay time of either one of said first and second actuation signals;

during the rotation of said recording medium at said predetermined speed by said driving means a predetermined interval of time is required between the instant that a desired portion of said recording medium passes the position of said record head means and the instant that said desired portion passes the position of said erase head means, said control means detects a rotational position of said recording medium rotated by said driving means to output said second actuation signal before the expiration of a predetermined time interval after the passage of the desired portion of said recording medium through the position of said record head means, said control means generates a reference signal of a predetermined period, said driving means is responsive to said reference signal to control the rotation of said recording medium, and said control means is responsive to said reference signal to detect the rotational position of said recording medium rotated by said driving means.

2. An apparatus according to claim 1, wherein said record head means is enabled to record information on said recording medium in response to said first actuation signal, and wherein said erase head means is enabled to erase the information recorded on said recording medium in response to said second actuation signal.

* * * * *